(12) United States Patent
Shaburova

(10) Patent No.: US 11,450,349 B2
(45) Date of Patent: *Sep. 20, 2022

(54) REAL TIME VIDEO PROCESSING FOR CHANGING PROPORTIONS OF AN OBJECT IN THE VIDEO

(71) Applicant: Snap Inc., Santa Monica, CA (US)

(72) Inventor: Elena Shaburova, Castro Valley, CA (US)

(73) Assignee: Snap Inc., Santa Monica, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/749,708

(22) Filed: Jan. 22, 2020

(65) Prior Publication Data
US 2020/0160886 A1 May 21, 2020

Related U.S. Application Data

(63) Continuation of application No. 14/314,312, filed on Jun. 25, 2014, now Pat. No. 10,586,570.
(Continued)

(51) Int. Cl.
*G06K 9/36* (2006.01)
*G06K 9/00* (2022.01)
(Continued)

(52) U.S. Cl.
CPC ............ *G11B 27/031* (2013.01); *G06F 3/011* (2013.01); *G06N 20/00* (2019.01); *G06T 5/005* (2013.01);
(Continued)

(58) Field of Classification Search
None
See application file for complete search history.

(56) References Cited

U.S. PATENT DOCUMENTS 4,888,713 A 12/1989 Falk
5,359,706 A 10/1994 Sterling
(Continued)

FOREIGN PATENT DOCUMENTS

CA 2887596 A1 7/2015
KR 100853122 B1 8/2008

OTHER PUBLICATIONS

Forlenza et al., "Real time corner detection for miniaturized electro-optical sensors onboard small unmanned aerial systems." Sensors 12, No. 1 (2012): 863-877 (Year: 2012).*
(Continued)

*Primary Examiner* — Feng Niu
(74) *Attorney, Agent, or Firm* — Schwegman Lundberg & Woessner, P.A.

(57) ABSTRACT

Method involving: providing an object in the video that at least partially and at least occasionally is presented in frames of a video; detecting the object in the video, wherein said detection comprises detecting feature reference points of the object; tracking the detected object in the video, wherein the tracking comprises creating a mesh that is based on the detected feature reference points of the object and aligning the mesh to the object in each frame; generating a first set of node points on the created mesh based on a request for changing proportions; generating a second set of node points based on the first set of node points; and transforming the frames of the video in such way that the object's proportions are transformed in accordance with the second set of the node points using the mesh.

20 Claims, 9 Drawing Sheets

Related U.S. Application Data

(60) Provisional application No. 61/936,016, filed on Feb. 5, 2014.

(51) Int. Cl.

| | | |
|---|---|---|
| *G11B 27/031* | (2006.01) | |
| *G06T 5/00* | (2006.01) | |
| *G06T 11/00* | (2006.01) | |
| *G06N 20/00* | (2019.01) | |
| *G06T 7/246* | (2017.01) | |
| *G06V 10/40* | (2022.01) | |
| *G06V 10/42* | (2022.01) | |
| *G06V 10/56* | (2022.01) | |
| *G06V 10/60* | (2022.01) | |
| *G06V 20/40* | (2022.01) | |
| *G06V 40/20* | (2022.01) | |
| *G06V 40/16* | (2022.01) | |
| *G06T 13/40* | (2011.01) | |
| *G06T 17/20* | (2006.01) | |
| *G06T 19/20* | (2011.01) | |
| *G06F 3/01* | (2006.01) | |
| *H04N 5/262* | (2006.01) | |
| *G06T 11/60* | (2006.01) | |
| *H04N 9/79* | (2006.01) | |
| *G06T 7/33* | (2017.01) | |
| *G06T 7/90* | (2017.01) | |
| *G06V 10/46* | (2022.01) | |

(52) U.S. Cl.
CPC .............. *G06T 7/246* (2017.01); *G06T 7/251* (2017.01); *G06T 7/33* (2017.01); *G06T 7/90* (2017.01); *G06T 11/001* (2013.01); *G06T 11/60* (2013.01); *G06T 13/40* (2013.01); *G06T 17/20* (2013.01); *G06T 19/20* (2013.01); *G06V 10/40* (2022.01); *G06V 10/42* (2022.01); *G06V 10/56* (2022.01); *G06V 10/60* (2022.01); *G06V 20/40* (2022.01); *G06V 20/46* (2022.01); *G06V 40/167* (2022.01); *G06V 40/168* (2022.01); *G06V 40/171* (2022.01); *G06V 40/174* (2022.01); *G06V 40/20* (2022.01); *H04N 5/262* (2013.01); *H04N 9/79* (2013.01); *G06T 2207/10016* (2013.01); *G06T 2207/10021* (2013.01); *G06T 2207/10024* (2013.01); *G06T 2207/20036* (2013.01); *G06T 2207/30201* (2013.01); *G06V 10/467* (2022.01)

(56) References Cited

U.S. PATENT DOCUMENTS

| | | | |
|---|---|---|---|
| 5,479,603 A | 12/1995 | Stone et al. | |
| 6,038,295 A | 3/2000 | Mattes | |
| 6,252,576 B1 | 6/2001 | Nottingham | |
| H2003 H | 11/2001 | Minner | |
| 6,492,986 B1 | 12/2002 | Metaxas et al. | |
| 6,621,939 B1 | 9/2003 | Negishi et al. | |
| 6,768,486 B1 | 7/2004 | Szabo et al. | |
| 6,807,290 B2 | 10/2004 | Liu et al. | |
| 6,891,549 B2 * | 5/2005 | Gold | G06T 5/20 345/611 |
| 6,897,977 B1 | 5/2005 | Bright | |
| 6,980,909 B2 | 12/2005 | Root et al. | |
| 7,034,820 B2 | 4/2006 | Urisaka et al. | |
| 7,039,222 B2 | 5/2006 | Simon et al. | |
| 7,050,078 B2 | 5/2006 | Dempski | |
| 7,119,817 B1 | 10/2006 | Kawakami | |
| 7,167,519 B2 | 1/2007 | Comaniciu et al. | |
| 7,173,651 B1 | 2/2007 | Knowles | |
| 7,212,656 B2 | 5/2007 | Liu et al. | |
| 7,227,567 B1 | 6/2007 | Beck et al. | |
| 7,239,312 B2 | 7/2007 | Urisaka et al. | |
| 7,411,493 B2 | 8/2008 | Smith | |
| 7,415,140 B2 | 8/2008 | Nagahashi et al. | |
| 7,535,890 B2 | 5/2009 | Rojas | |
| 7,538,764 B2 * | 5/2009 | Salomie | G06T 17/20 345/418 |
| 7,564,476 B1 | 7/2009 | Coughlan et al. | |
| 7,671,318 B1 * | 3/2010 | Tener | G01J 5/0806 250/208.1 |
| 7,697,787 B2 | 4/2010 | Illsley | |
| 7,710,608 B2 | 5/2010 | Takahashi | |
| 7,782,506 B2 * | 8/2010 | Suzuki | H04N 1/00002 358/514 |
| 7,812,993 B2 | 10/2010 | Bright | |
| 7,830,384 B1 | 11/2010 | Edwards et al. | |
| 7,945,653 B2 | 5/2011 | Zuckerberg et al. | |
| 7,971,156 B2 | 6/2011 | Albertson et al. | |
| 8,026,931 B2 | 9/2011 | Sun et al. | |
| 8,086,060 B1 * | 12/2011 | Gilra | G06T 5/007 382/254 |
| 8,131,597 B2 | 3/2012 | Hudetz | |
| 8,199,747 B2 | 6/2012 | Rojas et al. | |
| 8,230,355 B1 | 7/2012 | Bauermeister et al. | |
| 8,253,789 B2 | 8/2012 | Aizaki et al. | |
| 8,295,557 B2 | 10/2012 | Wang et al. | |
| 8,296,456 B2 | 10/2012 | Klappert | |
| 8,314,842 B2 | 11/2012 | Kudo | |
| 8,332,475 B2 | 12/2012 | Rosen et al. | |
| 8,335,399 B2 | 12/2012 | Gyotoku | |
| 8,462,198 B2 | 6/2013 | Lin et al. | |
| 8,675,972 B2 | 3/2014 | Lefevre et al. | |
| 8,717,465 B2 | 5/2014 | Ning | |
| 8,718,333 B2 | 5/2014 | Wolf et al. | |
| 8,724,622 B2 | 5/2014 | Rojas | |
| 8,743,210 B2 | 6/2014 | Lin | |
| 8,761,497 B2 | 6/2014 | Berkovich et al. | |
| 8,766,983 B2 | 7/2014 | Marks et al. | |
| 8,810,696 B2 | 8/2014 | Ning | |
| 8,824,782 B2 | 9/2014 | Ichihashi et al. | |
| 8,874,677 B2 | 10/2014 | Rosen et al. | |
| 8,909,679 B2 | 12/2014 | Root et al. | |
| 8,929,614 B2 | 1/2015 | Oicherman et al. | |
| 8,934,665 B2 | 1/2015 | Kim et al. | |
| 8,958,613 B2 | 2/2015 | Kondo et al. | |
| 8,976,862 B2 * | 3/2015 | Kim | H04N 19/50 375/240.12 |
| 8,995,433 B2 | 3/2015 | Rojas | |
| 9,032,314 B2 | 5/2015 | Mital et al. | |
| 9,040,574 B2 | 5/2015 | Wang et al. | |
| 9,055,416 B2 | 6/2015 | Rosen et al. | |
| 9,100,806 B2 | 8/2015 | Rosen et al. | |
| 9,100,807 B2 | 8/2015 | Rosen et al. | |
| 9,191,776 B2 | 11/2015 | Root et al. | |
| 9,204,252 B2 | 12/2015 | Root | |
| 9,225,897 B1 | 12/2015 | Sehn et al. | |
| 9,232,189 B2 | 1/2016 | Shaburov et al. | |
| 9,276,886 B1 | 3/2016 | Samaranayake | |
| 9,364,147 B2 | 6/2016 | Wakizaka et al. | |
| 9,396,525 B2 | 7/2016 | Shaburova et al. | |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,565,362 B2 | 2/2017 | Kudo | |
| 9,705,831 B2 | 7/2017 | Spiegel | |
| 9,742,713 B2 | 8/2017 | Spiegel et al. | |
| 9,928,874 B2 | 3/2018 | Shaburova | |
| 10,102,423 B2 | 10/2018 | Shaburov et al. | |
| 10,255,948 B2 | 4/2019 | Shaburova et al. | |
| 10,271,010 B2 * | 4/2019 | Gottlieb | H04N 7/141 |
| 10,283,162 B2 | 5/2019 | Shaburova et al. | |
| 10,284,508 B1 | 5/2019 | Allen et al. | |
| 10,438,631 B2 | 10/2019 | Shaburova et al. | |
| 10,439,972 B1 | 10/2019 | Spiegel et al. | |
| 10,509,466 B1 | 12/2019 | Miller et al. | |
| 10,514,876 B2 | 12/2019 | Sehn | |
| 10,566,026 B1 | 2/2020 | Shaburova | |
| 10,586,570 B2 | 3/2020 | Shaburova et al. | |
| 10,614,855 B2 | 4/2020 | Huang | |

(56) References Cited

U.S. PATENT DOCUMENTS

| | | |
|---|---|---|
| 10,748,347 B1 | 8/2020 | Li et al. |
| 10,950,271 B1 | 3/2021 | Shaburova et al. |
| 10,958,608 B1 | 3/2021 | Allen et al. |
| 10,962,809 B1 | 3/2021 | Castañeda |
| 10,991,395 B1 | 4/2021 | Shaburova et al. |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 2002/0012454 A1 | 1/2002 | Liu et al. |
| 2003/0107568 A1 | 6/2003 | Urisaka et al. |
| 2003/0132946 A1* | 7/2003 | Gold .................. G06T 7/13 |
| | | 345/611 |
| 2003/0228135 A1 | 12/2003 | Ilisley |
| 2004/0076337 A1 | 4/2004 | Nishida |
| 2004/0119662 A1 | 6/2004 | Dempski |
| 2004/0130631 A1 | 7/2004 | Suh |
| 2004/0233223 A1 | 11/2004 | Schkolne et al. |
| 2005/0046905 A1 | 3/2005 | Aizaki et al. |
| 2005/0117798 A1 | 6/2005 | Patton et al. |
| 2005/0128211 A1 | 6/2005 | Berger et al. |
| 2005/0180612 A1 | 8/2005 | Nagahashi et al. |
| 2005/0190980 A1 | 9/2005 | Bright |
| 2005/0202440 A1 | 9/2005 | Fletterick et al. |
| 2005/0220346 A1 | 10/2005 | Akahori |
| 2005/0238217 A1 | 10/2005 | Enomoto et al. |
| 2006/0098248 A1* | 5/2006 | Suzuki ............... H04N 1/00068 |
| | | 358/496 |
| 2006/0170937 A1 | 8/2006 | Takahashi |
| 2006/0227997 A1 | 10/2006 | Au et al. |
| 2006/0242183 A1 | 10/2006 | Niyogi et al. |
| 2006/0290695 A1* | 12/2006 | Salomie ................. G06T 17/20 |
| | | 345/420 |
| 2007/0013709 A1 | 1/2007 | Charles et al. |
| 2007/8735249 | 4/2007 | Fletterick et al. |
| 2007/0140556 A1 | 6/2007 | Willamowski et al. |
| 2007/0159551 A1 | 7/2007 | Kotani |
| 2007/0216675 A1 | 9/2007 | Sun et al. |
| 2007/0258656 A1 | 11/2007 | Aarabi et al. |
| 2007/0268312 A1 | 11/2007 | Marks et al. |
| 2008/0184153 A1 | 7/2008 | Matsumura et al. |
| 2008/0187175 A1 | 8/2008 | Kim et al. |
| 2008/0204992 A1 | 8/2008 | Swenson et al. |
| 2008/0212894 A1 | 9/2008 | Demirli et al. |
| 2009/0158170 A1 | 6/2009 | Narayanan et al. |
| 2009/0290791 A1 | 11/2009 | Holub et al. |
| 2009/0310828 A1* | 12/2009 | Kakadiaris ............ G06K 9/4661 |
| | | 382/118 |
| 2010/0177981 A1 | 7/2010 | Wang et al. |
| 2010/0185963 A1 | 7/2010 | Slik et al. |
| 2010/0188497 A1 | 7/2010 | Aizaki et al. |
| 2010/0203968 A1 | 8/2010 | Gill et al. |
| 2010/0316281 A1* | 12/2010 | Lefevre ................. G06T 7/75 |
| | | 382/154 |
| 2011/1887541 | 1/2011 | Arahari et al. |
| 2011/0182357 A1* | 7/2011 | Kim ..................... H04N 19/50 |
| | | 375/240.12 |
| 2011/0202598 A1 | 8/2011 | Evans et al. |
| 2011/0273620 A1 | 11/2011 | Berkovich et al. |
| 2012/0106806 A1 | 5/2012 | Folta et al. |
| 2012/0136668 A1 | 5/2012 | Kuroda |
| 2012/0144325 A1 | 6/2012 | Mital et al. |
| 2012/0167146 A1 | 6/2012 | Incorvia |
| 2012/0209924 A1 | 8/2012 | Evans et al. |
| 2012/0288187 A1 | 11/2012 | Ichihashi et al. |
| 2012/0306853 A1 | 12/2012 | Wright et al. |
| 2013/0004096 A1 | 1/2013 | Goh et al. |
| 2013/0114867 A1 | 5/2013 | Kondo et al. |
| 2013/0190577 A1 | 7/2013 | Brunner et al. |
| 2013/0201105 A1 | 8/2013 | Ptucha et al. |
| 2013/0201187 A1 | 8/2013 | Tong et al. |
| 2013/0208129 A1 | 8/2013 | Sten |
| 2013/0216094 A1 | 8/2013 | Delean |
| 2013/0229409 A1* | 9/2013 | Song .................. H04N 13/139 |
| | | 345/419 |
| 2013/0235086 A1 | 9/2013 | Otake |
| 2013/0287291 A1 | 10/2013 | Cho |
| 2014/0043329 A1 | 2/2014 | Wang et al. |
| 2014/0198177 A1 | 7/2014 | Castellani et al. |
| 2014/0228668 A1 | 8/2014 | Wakizaka et al. |
| 2015/0097834 A1 | 4/2015 | Ma et al. |
| 2015/0116448 A1 | 4/2015 | Gottlieb |
| 2015/0131924 A1 | 5/2015 | He et al. |
| 2015/0145992 A1 | 5/2015 | Traff |
| 2015/0163416 A1 | 6/2015 | Nevatie |
| 2015/0195491 A1 | 7/2015 | Shaburov et al. |
| 2015/0213604 A1 | 7/2015 | Li et al. |
| 2015/0220252 A1 | 8/2015 | Mital et al. |
| 2015/0221069 A1 | 8/2015 | Shaburova et al. |
| 2015/0221118 A1 | 8/2015 | Shaburova |
| 2015/0221136 A1 | 8/2015 | Shaburova et al. |
| 2015/0221338 A1 | 8/2015 | Shaburova et al. |
| 2015/0222821 A1 | 8/2015 | Shaburova |
| 2016/0322079 A1 | 11/2016 | Shaburova et al. |
| 2018/0036481 A1 | 12/2018 | Parshionikar |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |

OTHER PUBLICATIONS

Phadke et al., "Illumination invariant Mean-shift tracking," 2013 IEEE Workshop on Applications of Computer Vision (WACV), 2013, pp. 407-412, doi: 10.1109/WACV.2013.6475047 (Year: 2013).*

"U.S. Appl. No. 16/298,721, Advisory Action dated May 12, 2020", 3 pgs.

"U.S. Appl. No. 16/298,721, Non Final Office Action dated Jul. 24, 2020", 80 pgs.

"U.S. Appl. No. 16/277,750, Non Final Office Action dated Aug. 5, 2020", 8 pgs.

"U.S. Appl. No. 16/298,721, Examiner Interview Summary dated Oct. 20, 2020", 3 pgs.

"U.S. Appl. No. 16/298,721, Response filed Oct. 22, 2020 to Non Final Office Action dated Jul. 24, 2020", 13 pgs.

"U.S. Appl. No. 16/277,750, Response filed Nov. 5, 2020 to Non Final Office Action dated Aug. 5, 2020", 27 pgs.

"U.S. Appl. No. 16/298,721, Notice of Allowance dated Nov. 10, 2020", 5 pgs.

"U.S. Appl. No. 14/114,124, Response filed Oct. 5, 2016 to Final Office Action dated May 5, 2016", 14 pgs.

"U.S. Appl. No. 14/314,312, Advisory Action dated May 10, 2019", 3 pgs.

"U.S. Appl. No. 14/314,312, Appeal Brief filed Oct. 3, 2019", 14 pgs.

"U.S. Appl. No. 14/314,312, Final Office Action dated Mar. 22, 2019", 28 pgs.

"U.S. Appl. No. 14/314,312, Final Office Action dated Apr. 12, 2017", 34 pgs.

"U.S. Appl. No. 14/314,312, Final Office Action dated May 5, 2016", 28 pgs.

"U.S. Appl. No. 14/314,312, Final Office Action dated May 10, 2018", 32 pgs.

"U.S. Appl. No. 14/314,312, Non Final Office Action dated Jul. 5, 2019", 25 pgs.

(56) References Cited

OTHER PUBLICATIONS

"U.S. Appl. No. 14/314,312, Non Final Office Action dated Aug. 30, 2017", 32 pgs.
"U.S. Appl. No. 14/314,312, Non Final Office Action dated Oct. 17, 2016", 33 pgs.
"U.S. Appl. No. 14/314,312, Non Final Office Action dated Nov. 5, 2015", 26 pgs.
"U.S. Appl. No. 14/314,312, Non Final Office Action dated Nov. 27, 2018", 29 pgs.
"U.S. Appl. No. 14/314,312, Notice of Allowability dated Jan. 7, 2020", 3 pgs.
"U.S. Appl. No. 14/314,312, Notice of Allowance dated Oct. 25, 2019", 9 pgs.
"U.S. Appl. No. 14/314,312, Response filed Jan. 28, 2019 to Non Final Office Action dated Nov. 27, 2018", 10 pgs.
"U.S. Appl. No. 14/314,312, Response filed Feb. 28, 2018 to Non Final Office Action dated Aug. 30, 2017", 13 pgs.
"U.S. Appl. No. 14/314,312, Response filed Mar. 17, 2017 to Non Final Office Action dated Oct. 17, 2016", 12 pgs.
"U.S. Appl. No. 14/314,312, Response filed Apr. 5, 2016 to Non Final Office Action dated Nov. 5, 2015", 13 pgs.
"U.S. Appl. No. 14/314,312, Response filed Aug. 14, 2017 to Final Office Action dated Apr. 12, 2017", 16 pgs.
"U.S. Appl. No. 14/314,312, Response filed Sep. 6, 2018 to Final Office Action dated May 10, 2018", 12 pgs.
"U.S. Appl. No. 14/314,312, Response filed Oct. 5, 2016 to Final Office Action dated May 5, 2016", 12 pgs.
"U.S. Appl. No. 14/314,312, Response filed May 3, 2019 to Final Office Action dated Mar. 22, 2019", 11 pgs.
"U.S. Appl. No. 14/314,324, Advisory Action dated Sep. 21, 2017", 4 pgs.
"U.S. Appl. No. 14/314,324, Final Office Action dated May 3, 2017", 33 pgs.
"U.S. Appl. No. 14/314,324, Final Office Action dated May 5, 2016", 24 pgs.
"U.S. Appl. No. 14/314,324, Non Final Office Action dated Oct. 14, 2016", 26 pgs.
"U.S. Appl. No. 14/314,324, Non Final Office Action dated Nov. 5, 2015", 23 pgs.
"U.S. Appl. No. 14/314,324, Notice of Allowance dated Nov. 8, 2017", 7 pgs.
"U.S. Appl. No. 14/314,324, Response filed Feb. 14, 2017 to Non Final Office Action dated Oct. 14, 2016", 19 pgs.
"U.S. Appl. No. 14/314,324, Response filed Apr. 5, 2016 to Non Final Office Action dated Nov. 5, 2015", 15 pgs.
"U.S. Appl. No. 14/314,324, Response filed Sep. 1, 2017 to Final Office Action dated May 3, 2017", 10 pgs.
"U.S. Appl. No. 14/314,324, Response Filed Oct. 5, 2016 to Final Office Action dated May 5, 2016", 14 pgs.
"U.S. Appl. No. 14/314,324, Response filed Nov. 3, 2017 to Advisory Action dated Sep. 21, 2017", 11 pgs.
"U.S. Appl. No. 14/314,334, Appeal Brief filed Apr. 15, 2019", 19 pgs.
"U.S. Appl. No. 14/314,334, Examiner Interview Summary dated Apr. 28, 2017", 3 pgs.
"U.S. Appl. No. 14/314,334, Examiner Interview Summary dated Nov. 26, 2018", 3 pgs.
"U.S. Appl. No. 14/314,334, Final Office Action dated Feb. 15, 2019", 40 pgs.
"U.S. Appl. No. 14/314,334, Final Office Action dated May 16, 2016", 43 pgs.
"U.S. Appl. No. 14/314,334, Final Office Action dated May 31, 2018", 38 pgs.
"U.S. Appl. No. 14/314,334, Final Office Action dated Jul. 12, 2017", 40 pgs.
"U.S. Appl. No. 14/314,334, Non Final Office Action dated Jan. 22, 2018", 35 pgs.
"U.S. Appl. No. 14/314,334, Non Final Office Action dated Oct. 26, 2018", 39 pgs.
"U.S. Appl. No. 14/314,334, Non Final Office Action dated Nov. 13, 2015", 39 pgs.
"U.S. Appl. No. 14/314,334, Non Final Office Action dated Dec. 1, 2016", 45 pgs.
"U.S. Appl. No. 14/314,334, Notice of Allowance dated Jul. 1, 2019", 9 pgs.
"U.S. Appl. No. 14/314,334, Notice of Allowance dated Sep. 19, 2017", 5 pgs.
"U.S. Appl. No. 14/314,334, Response filed Apr. 13, 2016 to Non Final Office Action dated Nov. 13, 2015", 20 pgs.
"U.S. Appl. No. 14/314,334, Response Filed Apr. 23, 2018 to Non Final Office Action dated Jan. 22, 2018", 14 pgs.
"U.S. Appl. No. 14/314,334, Response filed May 20, 2017 to Non Final Office Action dated Dec. 1, 2016", 16 pgs.
"U.S. Appl. No. 14/314,334, Response filed Aug. 30, 2018 to Final Office Action dated May 31, 2018", 13 pgs.
"U.S. Appl. No. 14/314,334, Response filed Sep. 1, 2017 to Final Office Action dated Jul. 12, 2017", 12 pgs.
"U.S. Appl. No. 14/314,334, Response filed Oct. 17, 2016 to Final Office Action dated May 16, 2016", 16 pgs.
"U.S. Appl. No. 14/314,343, Final Office Action dated May 6, 2016", 19 pgs.
"U.S. Appl. No. 14/314,343, Final Office Action dated Aug. 15, 2017", 38 pgs.
"U.S. Appl. No. 14/314,343, Final Office Action dated Sep. 6, 2018", 43 pgs.
"U.S. Appl. No. 14/314,343, Non Final Office Action dated Apr. 19, 2018", 40 pgs.
"U.S. Appl. No. 14/314,343, Non Final Office Action dated Nov. 4, 2015", 14 pgs.
"U.S. Appl. No. 14/314,343, Non Final Office Action dated Nov. 17, 2016", 31 pgs.
"U.S. Appl. No. 14/314,343, Notice of Allowance dated Dec. 17, 2018", 5 pgs.
"U.S. Appl. No. 14/314,343, Response filed Feb. 15, 2018 to Final Office Action dated Aug. 15, 2017", 11 pgs.
"U.S. Appl. No. 14/314,343, Response filed Apr. 4, 2016 to Non Final Office Action dated Nov. 4, 2015", 10 pgs.
"U.S. Appl. No. 14/314,343, Response filed May 11, 2017 to Non Final Office Action dated Nov. 17, 2016", 13 pgs.
"U.S. Appl. No. 14/314,343, Response filed Jul. 19, 2018 to Non Final Office Action dated Apr. 19, 2018", 15 pgs.
"U.S. Appl. No. 14/314,343, Response filed Oct. 6, 2016 to Final Office Action dated May 6, 2016", 13 pgs.
"U.S. Appl. No. 14/314,343, Response Filed Oct. 11, 2018 to Final Office Action dated Sep. 6, 2018", 11 pgs.
"U.S. Appl. No. 14/325,477, Non Final Office Action dated Oct. 9, 2015", 17 pgs.
"U.S. Appl. No. 14/325,477, Notice of Allowance dated Mar. 17, 2016", 5 pgs.
"U.S. Appl. No. 14/325,477, Response filed Feb. 9, 2016 to Non Final Office Action dated Oct. 9, 2015", 13 pgs.
"U.S. Appl. No. 15/208,973, Final Office Action dated May 10, 2018", 13 pgs.
"U.S. Appl. No. 15/208,973, Non Final Office Action dated Sep. 19, 2017", 17 pgs.
"U.S. Appl. No. 15/208,973, Notice of Allowability dated Feb. 21, 2019", 3 pgs.
"U.S. Appl. No. 15/208,973, Notice of Allowance dated Nov. 20, 2018", 14 pgs.
"U.S. Appl. No. 15/208,973, Preliminary Amendment filed Jan. 17, 2017", 9 pgs.
"U.S. Appl. No. 15/208,973, Response filed Sep. 5, 2018 to Final Office Action dated May 10, 2018", 10 pgs.
"U.S. Appl. No. 15/921,282, Notice of Allowance dated Oct. 2, 2019", 9 pgs.
"U.S. Appl. No. 16/298,721, Non Final Office Action dated Oct. 3, 2019", 40 pgs.
"Bilinear interpolation", Wikipedia, [Online] Retrieved from the Internet: <URL: https://web.archive.org/web/20110921104425/http://en.wikipedia.org/wiki/Bilinear_interpolation>, (Jan. 8, 2014), 3 pgs.

(56) References Cited

OTHER PUBLICATIONS

"Imatest", [Online] Retrieved from the Internet on Jul. 10, 2015: <URL: https://web.archive.org/web/20150710000557/http://www.imatest.com/>, 3 pgs.

"KR 10-0853122 B1 machine translation", IP.com, (2008), 29 pgs.

Ahlberg, Jorgen, "Candide-3: An Updated Parameterised Face", Image Coding Group, Dept. of Electrical Engineering, Linkoping University, SE, (Jan. 2001), 16 pgs.

Baxes, Gregory A., et al., "Digital Image Processing: Principles and Applications, Chapter 4", New York: Wiley, (1994), 88-91.

Chen, et al., "Manipulating, Deforming and Animating Sampled Object Representations", Computer Graphics Forum vol. 26, (2007), 824-852 pgs.

Dornaika, F, et al., "On Appearance Based Face and Facial Action Tracking", IEEE Trans. Circuits Syst. Video Technol. 16(9), (Sep. 2006), 1107-1124.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Milborrow, S, et al., "Locating facial features with an extended active shape model", European Conference on Computer Vision, Springer, Berlin, Heidelberg, [Online] Retrieved from the Internet: <URL: http://www.milbo.org/stasm-files/locating-facial-features-with-an-extended-asm.pdf>, (2008), 11 pgs.

Ohya, Jun, et al., "Virtual Metamorphosis", IEEE MultiMedia, 6(2), (1999), 29-39.

"U.S. Appl. No. 16/298,721, Final Office Action dated Mar. 6, 2020", 54 pgs.

"U.S. Appl. No. 18/298,721, Response filed Jan. 3, 2020 to Non Final Office Action dated Oct. 3, 2019", 10 pgs.

"U.S. Appl. No. 16/298,721, Response filed Apr. 23, 2020 to Final Office Action dated Mar. 6, 2020", 11 pgs.

"U.S. Appl. No. 16/277,750, Notice of Allowance dated Nov. 30, 2020", 5 pgs.

"U.S. Appl. No. 16/277,750, PTO Response to Rule 312 Communication dated Mar. 30, 2021", 2 pgs.

"U.S. Appl. No. 16/277,750, Supplemental Notice of Allowability dated Dec. 28, 2020", 2 pgs.

"U.S. Appl. No. 16/298,721, PTO Response to Rule 312 Communication dated Feb. 4, 2021", 2 pgs.

"U.S. Appl. No. 16/548,279, Advisory Action dated Jul. 23, 2021", 3 pgs.

"U.S. Appl. No. 16/548,279, Final Office Action dated May 21, 2021", 24 pgs.

"U.S. Appl. No. 16/548,279, Non Final Office Action dated Mar. 1, 2021", 26 pgs.

"U.S. Appl. No. 16/548,279, Non Final Office Action dated Aug. 4, 2021", 23 pgs.

"U.S. Appl. No. 16/548,279, filed May 5, 2021 to Non Final Office Action dated Mar. 1, 2021", 11 pgs.

"U.S. Appl. No. 16/548,279, Response filed Jul. 16, 2021 to Final Office Action dated May 21, 2021", 10 pgs.

"U.S. Appl. No. 16/732,858, Non Final Office Action dated Jul. 19, 2021", 29 pgs.

"U.S. Appl. No. 16/732,858, Response filed Oct. 19, 2021 to Non Final Office Action dated Jul. 19, 2021", 12 pgs.

Neoh, Hong Shan, et al., "Adaptive Edge Detection for Real-Time Video Processing using FPGAs", Global Signal Processing, vol. 7. No. 3, (2004), 7 pgs.

Tchoulack, Stephane, et al., "A Video Stream Processor for Real-time Detection and Correction of Specular Reflections in Endoscopic Images", 2008 Joint 6th International IEEE Northeast Workshop on Circuits and Systems and TAISA Conference, (2008), 49-52.

U.S. Appl. No. 17/248,812, filed Feb. 9, 2021, Method for Triggering Events in a Video.

"U.S. Appl. No. 16/548,279, Advisory Action dated Jan. 13, 2022", 4 pgs.

"U.S. Appl. No. 16/548,279, Final Office Action dated Nov. 12, 2021", 31 pgs.

"U.S. Appl. No. 16/548,279, Non Final Office Action dated Feb. 17, 2022", 37 pgs.

"U.S. Appl. No. 16/548,279, Response filed Jan. 5, 22 to Final Office Action dated Nov. 12, 2021", 12 pgs.

"U.S. Appl. No. 16/548,279, Response filed Nov. 1, 2021 to Non Final Office Action dated Aug. 4, 2021", 11 pgs.

"U.S. Appl. No. 16/732,858, Advisory Action dated Jan. 12, 2022", 3 pgs.

"U.S. Appl. No. 16/732,858, Final Office Action dated Nov. 4, 2021", 19 pgs.

"U.S. Appl. No. 16/732,858, Non Final Office Action dated Feb. 9, 2022", 26 pgs.

"U.S. Appl. No. 16/732,858, Response filed Jan. 3, 2022 to Final Office Action dated Nov. 4, 2021", 10 pgs.

"U.S. Appl. No. 17/248,812, Non Final Office Action dated Nov. 22, 2021", 39 pgs.

"U.S. Appl. No. 17/248,812, Notice of Allowance dated Mar. 23, 2022", 5 pgs.

"U.S. Appl. No. 17/248,812, Response filed Feb. 18, 2022 to Non Final Office Action dated Nov. 22, 2021", 12 pgs.

"Facial Action Coding System", Wikipedia, [Online], Retrieved from the Internet: <URL: https://en.wikipedia.org/w/index.php?title=Facial_Action_Coding_System&oldid=591978414 >, (Jan. 23, 2014), 6 pgs.

Baldwin, Bernard, et al., "Resolution-Appropriate Shape Representation", Sixth International Conference on Computer Vision (IEEE Cat. No. 98CH36271), (1998), 460-465.

Forlenza, Lidia, et al., "Real Time Corner Detection for Miniaturized Electro-Optical Sensors Onboard Small Unmanned Aerial Systems", Sensors, 12(1), (2012), 863-877.

Kaufmann, Peter, et al., "Finite Element Image Warping", Computer Graphics Forum, vol. 32, No. 2-1, Oxford, UK: Blackwell Publishing Ltd., (2013), 31-39.

Lefevre, Stephanie, et al., "Structure and Appearance Features for Robust 3D Facial Actions Tracking", 2009 IEEE International Conference on Multimedia and Expo, (2009), 298-301.

Li, Yongqiang, et al., "Simultaneous Facial Feature Tracking and Facial Expression Recognition", IEEE Transactions on Image Processing, 22(7), (Jul. 2013), 2559-2573.

Salmi, Jussi, et al., "Hierarchical grid transformation for image warping in the analysis of two-dimensional electrophoresis gels", Proteomics, 2(11), (2002), 1504-1515.

Su, Zihua, "Statistical Shape Modelling: Automatic Shape Model Building", Submitted to the University College London for the Degree of Doctor of Philosophy, (2011), 238 pgs.

\* cited by examiner

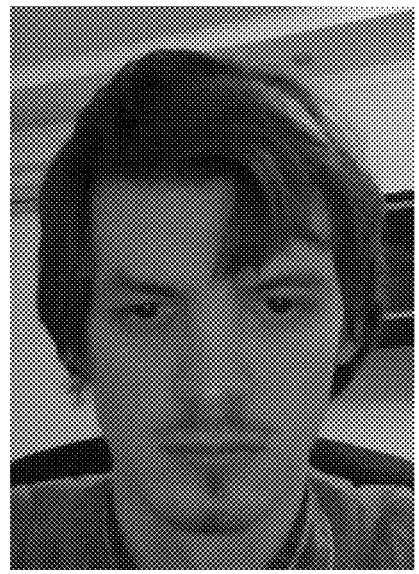
FIG. 8a
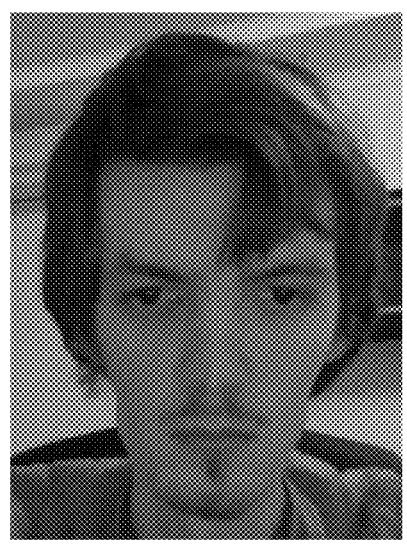 
FIG. 8b      FIG. 8c

REAL TIME VIDEO PROCESSING FOR CHANGING PROPORTIONS OF AN OBJECT IN THE VIDEO

CROSS-REFERENCE TO RELATED APPLICATIONS

This application is a continuation of and claims the benefit of priority of U.S. patent application Ser. No. 14/314,312, filed Jun. 25, 2014, which claims the benefit of U.S. Provisional Application No. 61/936,016, filed on Feb. 28, 2014, which are hereby incorporated by reference herein in their entirety.

BACKGROUND OF THE INVENTION

Technical Field

The disclosed embodiments relate generally to the field of real time video processing, in particular, to a system and method of real time video processing for changing proportions of an object in the video.

Description of the Related Art

Nowadays a variety of devices and programs can provide processing of still images, for example effects like face thinning, makeup, etc, and processing of real time video using some filters (for example, web cam video). Also some face tracking algorithms and implementations for video streams or video data are known.

In particular, some programs can change an object in a video stream, for example, change a person's face by changing proportions of a whole frame or overlaying any extra objects on a person's face. However, there are no programs that can implement changes to an object in a video stream that seem to be natural and cannot be recognized with the naked eye. Further, such programs cannot be implemented in real time by mobile devices, since they are resource-intensive and such devices cannot handle such operations for changing an object in real time.

U.S. Patent Application Publication No. US2007268312, incorporated herein by reference, discloses a method of replacing face elements by some components that is made by users as applied to real time video. This method involves changing of an object in a video stream by overlaying it with new predetermined images. However, it is not possible to process real time video such that an object shown in real time video can be modified in real time naturally with some effects. In case of a human's face such effects can include making a face fatter/thinner as well as other distortions.

Thus, new and improved systems and methods are needed that would enable real time video processing for changing proportions of an object in the video.

SUMMARY OF THE INVENTION

The embodiments described herein are directed to systems and methods that substantially obviate one or more of the above and other problems associated with the conventional technology for real time video processing.

In accordance with one aspect of the embodiments described herein, there is provided a computer-implemented method for real time video processing for changing proportions of an object in the video, the method involving: providing an object in the video that at least partially and at least occasionally is presented in frames of a video; detecting the object in the video, wherein said detection comprises detecting feature reference points of the object; tracking the detected object in the video, wherein the tracking comprises creating a mesh that is based on the detected feature reference points of the object and aligning the mesh to the object in each frame; generating a first set of node points on the created mesh based on a request for changing proportions; generating a second set of node points based on the first set of node points; and transforming the frames of the video in such way that the object's proportions are transformed in accordance with the second set of the node points using the mesh.

In one or more embodiments, the computer-implemented method further comprises creating a square grid associated with a background of the object in the video; and transforming the background of the object using the square grid to avoid the background distortion.

In one or more embodiments, the object in the video to be detected is a human face.

In one or more embodiments, the object's feature reference points are at least one of the points indicating eyebrows vertical position, eyes vertical position, eyes width, eyes height, eye separation distance, nose vertical position, nose pointing up, mouth vertical position, mouth width, chin width, upper lip raiser, jaw drop, lip stretcher, left brow lowerer, right brow lowerer, lip corner depressor, and outer brow raiser.

In one or more embodiments, the method further comprises: indicating a presence of an object from a list of objects in frames of the video, wherein the list further comprises rules for changing proportions of each object from the list; and generating a request for changing proportions of the object which presence in frames of the video is indicated.

In one or more embodiments, the method further comprises: defining an object to be changed in frames of the video and rules for changing proportions of the object by a user; and generating a request for changing proportions of the object defined by the user.

In one or more embodiments, the method further comprises: defining by a user a frame area of the video to be processed, wherein the frame area to be processed sets a frame area of the video such that only proportions of those objects or their parts which are positioned in the frame area to be processed are changed.

In one or more embodiments, the method further comprises: randomly selecting at least one object to be changed in frames of the video out of the objects in frames of the video and randomly selecting at least one rule for changing proportions of the selected object out of a list of rules; and generating a request for changing proportions of the randomly selected object based on the randomly selected rules.

In one or more embodiments, the detecting of the object in the video is implemented with the use of Viola-Jones method.

In one or more embodiments, the detecting of the object's feature points is implemented with the use of an Active Shape Model (ASM).

In one or more embodiments, the processed video comprises a video stream.

In accordance with another aspect of the embodiments described herein, there is provided a mobile computerized system comprising a central processing unit and a memory, the memory storing instructions for: providing an object in the video that at least partially and at least occasionally is presented in frames of a video; detecting the object in the video, wherein said detection comprises detecting feature reference points of the object; tracking the detected object in the video, wherein the tracking comprises creating a mesh that is based on the detected feature reference points of the object and aligning the mesh to the object in each frame; generating a first set of node points on the created mesh based on a request for changing proportions; generating a second set of node points based on the first set of node points; and transforming the frames of the video in such way that the object's proportions are transformed in accordance with the second set of the node points using the mesh.

In one or more embodiments, the memory further stores instructions for creating a square grid associated with a background of the object in the video; and transforming the background of the object using the square grid to avoid the background distortion.

In one or more embodiments, the object in the video to be detected is a human face.

In one or more embodiments, the object's feature reference points are at least one of the points indicating eyebrows vertical position, eyes vertical position, eyes width, eyes height, eye separation distance, nose vertical position, nose pointing up, mouth vertical position, mouth width, chin width, upper lip raiser, jaw drop, lip stretcher, left brow lowerer, right brow lowerer, lip corner depressor, and outer brow raiser.

In one or more embodiments, the memory storing further instructions for: indicating a presence of an object from a list of objects in frames of the video, wherein the list further comprises rules for changing proportions of each object from the list; and generating a request for changing proportions of the object which presence in frames of the video is indicated.

In one or more embodiments, the memory storing further instructions for: defining an object to be changed in frames of the video and rules for changing proportions of the object by a user; and generating a request for changing proportions of the object defined by the user.

In one or more embodiments, the memory storing further instructions for: defining by a user a frame area of the video to be processed, wherein the frame area to be processed sets a frame area of the video such that only proportions of those objects or their parts which are positioned in the frame area to be processed are changed.

In one or more embodiments, the memory storing further instructions for: randomly selecting at least one object to be changed in frames of the video out of the objects in frames of the video and randomly selecting at least one rule for changing proportions of the selected object out of a list of rules; and generating a request for changing proportions of the randomly selected object based on the randomly selected rules.

In one or more embodiments, the detecting of the object in the video is implemented with the use of Viola-Jones method.

In one or more embodiments, the detecting of the object's feature points is implemented with the use of an Active Shape Model (ASM).

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 8(a)-8(c) show an example of a normal face (a), a thin face with a thin nose provided by the method according to the present invention (b) and a fat face with a fat nose provided by the method according to the present invention (c).

DETAILED DESCRIPTION

Figure 1:
FIG. 1 illustrates facial feature points detected by an ASM algorithm used in the method according to one embodiment of the present invention.
Figure 1:
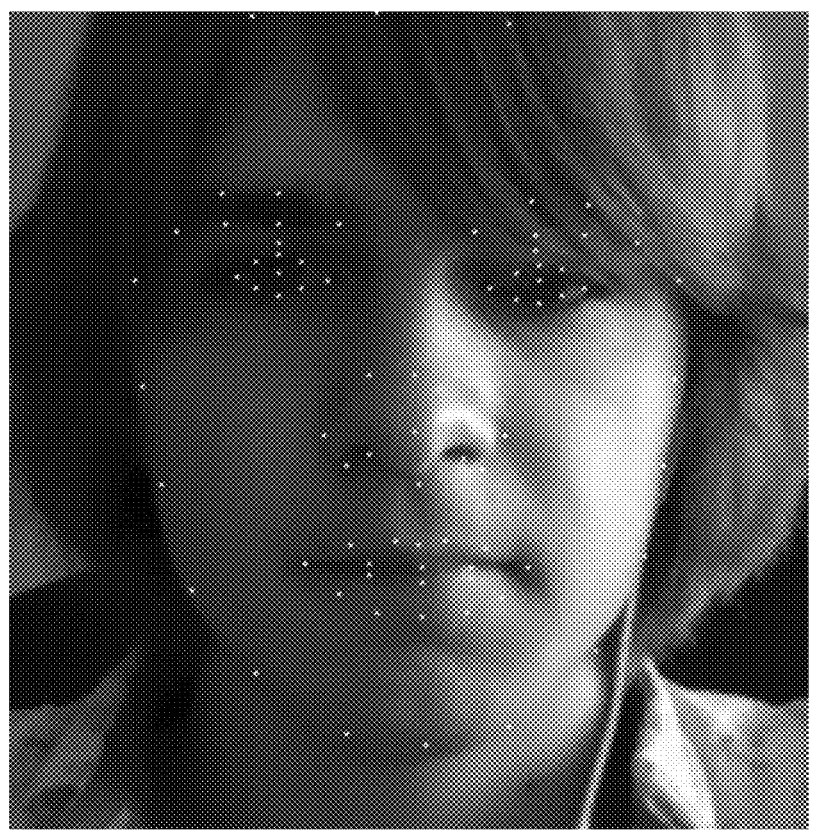

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

It will be appreciated that the method for real time video processing can be performed with any kind of video data, e.g. video streams, video files saved in a memory of a computerized system of any kind (such as mobile computer devices, desktop computer devices and others), and all other possible types of video data understandable for those skilled in the art. Any kind of video data can be processed, and the embodiments disclosed herein are not intended to be limiting the scope of the present invention by indicating a certain type of video data.

According to one aspect, the automatic real time video processing of the present invention is aimed to detecting person face in the video and changing its proportions.

However, it is obvious for one skilled in the art that proportions of other objects in video can be changed using the present method.

One embodiment described herein provides an automatic detection of a face in real time video and changing its proportions in said video to make the face thinner or thicker to the selected grade.

In one or more embodiments, the method of real time video processing for changing proportions of an object in the video involves face detection and a 6D head position estimation, in which yaw, pitch, roll, x, y, size are estimated. As human faces and heads may have different properties, such as eyes distance, head height etc, they are estimated from the first frame and don't change during a video processing. Positions of eyebrows, lips and yaw are also estimated at each frame, as they can move independently because of human gesture.

In one or more embodiments, the method uses tracked information to achieve changing of proportions. A video can be processed frame-by-frame, with no dependence between consequent frames or information about some previous frames can be used.

In addition, computation on the GPU is used to increase performance.

The embodiments disclosed further are aimed for processing of video streams, however all other types of video data including video files saved in a memory of a computerized system can be processed by the methods of the present invention. For example, a user can load video files and save them in a memory of his computerized system and such video files can be also processed by the methods of the present invention. According to one of the preferred embodiments the method of real time video stream processing for changing proportions of an object in the video stream comprises: providing an object in the video stream that at least partially and at least occasionally is presented in frames of a video stream; detecting the object in the video stream, wherein said detection comprises detecting feature reference points of the object; tracking the detected object in the video stream, wherein the tracking comprises creating a mesh that is based on the detected feature reference points of the object and aligning the mesh to the object in each frame; generating a first set of node points on the created mesh based on a request for changing proportions; generating a second set of node points based on the first set of node points; and transforming the frames of the video stream in such way that the object's proportions are transformed in accordance with the second set of the node points using the mesh.

According to one of the embodiments the computer implemented method of claim 1 includes further creating a square grid associated with a background of the object in the video stream; and transforming the background of the object using the square grid to avoid the background distortion.

One of the objects to be processed is a human face. In this case object's feature reference points for a human's face are at least one of the points indicating eyebrows vertical position, eyes vertical position, eyes width, eyes height, eye separation distance, nose vertical position, nose pointing up, mouth vertical position, mouth width, chin width, upper lip raiser, jaw drop, lip stretcher, left brow lowerer, right brow lowerer, lip corner depressor, and outer brow raiser.

According to one of the embodiments the method further comprises indicating a presence of an object from a list of objects in frames of the video stream, wherein the list further comprises rules for changing proportions of each object from the list; and generating a request for changing proportions of the object which presence in frames of the video stream is indicated.

According to another embodiment the method further includes defining an object to be changed in frames of the video stream and rules for changing proportions of the object by a user; and generating a request for changing proportions of the object defined by the user. In this case the method can further include defining by a user a frame area of the video stream to be processed, wherein the frame area to be processed sets a frame area of the video stream such that only proportions of those objects or their parts which are positioned in the frame area to be processed are changed.

According to yet another embodiment the method further includes randomly selecting at least one object to be changed in frames of the video stream out of the objects in frames of the video stream and randomly selecting at least one rule for changing proportions of the selected object out of a list of rules; and generating a request for changing proportions of the randomly selected object based on the randomly selected rules.

Face Detection and Initialization

In one or more embodiments, first, in the algorithm for changing proportion a user sends a request for changing proportions of an object in a video stream. The next step in the algorithm involves detecting the object in the video stream.

In one or more embodiments, the face is detected on an image with the use of Viola-Jones method. Viola-Jones method is a fast and quite accurate method used to detect the face region. Then, an Active Shape Model (ASM) algorithm is applied to the face region of an image to detect facial feature points. However, it should be appreciated that other methods and algorithms suitable for face detection can be used.

In one or more embodiments, for locating facial features locating of landmarks is used. A landmark represents a distinguishable point present in most of the images under consideration, for example, the location of the left eye pupil (FIG. 1).

In one or more embodiments, a set of landmarks forms a shape. Shapes are represented as vectors: all the x- followed by all the y-coordinates of the points in the shape. One shape is aligned to another with a similarity transform (allowing translation, scaling, and rotation) that minimizes the average Euclidean distance between shape points. The mean shape is the mean of the aligned training shapes (which in the present disclosure are manually landmarked faces).

Subsequently, in accordance with the ASM algorithm, the search for landmarks from the mean shape aligned to the position and size of the face determined by a global face detector is started. It then repeats the following two steps until convergence (i) suggest a tentative shape by adjusting the locations of shape points by template matching of the image texture around each point (ii) conform the tentative shape to a global shape model. The individual template matches are unreliable and the shape model pools the results of the weak template matchers to form a stronger overall classifier. The entire search is repeated at each level in an image pyramid, from coarse to fine resolution. It follows that two types of submodel make up the ASM: the profile model and the shape model.

In one or more embodiments, the profile models (one for each landmark at each pyramid level) are used to locate the approximate position of each landmark by template matching. Any template matcher can be used, but the classical ASM forms a fixed-length normalized gradient vector (called the profile) by sampling the image along a line (called the whisker) orthogonal to the shape boundary at the landmark. During training on manually landmarked faces, at each landmark the mean profile vector $\bar{g}$ and the profile covariance matrix Sg are calculated. During searching, the landmark along the whisker to the pixel whose profile g has lowest Mahalanobis distance from the mean profile $\bar{g}$ is displaced, where the $$\text{MahalanobisDistance}=(g-\bar{g})^T S_g^{-1}(g-\bar{g}). \quad (1)$$

In one or more embodiments, the shape model specifies allowable constellations of landmarks. It generates a shape $\hat{x}$ with $$\hat{x}=\bar{x}+\phi b \quad (2)$$

where $\bar{x}$ is the mean shape, b is a parameter vector, and $\phi$ is a matrix of selected eigenvectors of the covariance matrix Sg of the points of the aligned training shapes. Using a standard principal components approach model has as much variation in the training set as it is desired by ordering the eigenvalues λi of Ss and keeping an appropriate number of the corresponding eigenvectors in $\phi$. In the method is used a single shape model for the entire ASM but it is scaled for each pyramid level.

Subsequently, the Equation 2 is used to generate various shapes by varying the vector parameter b. By keeping the elements of b within limits (determined during model building) it is possible to ensure that generated face shapes are lifelike.

Conversely, given a suggested shape x, it is possible to calculate the parameter b that allows Equation 2 to best approximate x with a model shape $\hat{x}$. An iterative algorithm, described by Cootes and Taylor, that gives the b and T that minimizes $$\text{distance}(x,T(\bar{x}+\phi b)) \quad (3)$$

where T is a similarity transform that maps the model space into the image space is used.

In one or more embodiments, mapping can be built from facial feature points, detected by ASM, to Candide-3 point, and that gives us Candide-3 points x and y coordinates. Candide is a parameterised face mask specifically developed for model-based coding of human faces. Its low number of polygons (approximately 100) allows fast reconstruction with moderate computing power. Candide is controlled by global and local Action Units (AUs). The global ones correspond to rotations around three axes. The local Action Units control the mimics of the face so that different expressions can be obtained.

The following equation system can be made, knowing Candide-3 points x and y coordinates.

$$\Sigma_{j=1}^{m} X_{ij} * B_j = x_i, \quad (4)$$

$$\Sigma_{j=1}^{m} Y_{ij} * B_j = y_i, \quad (5)$$

where Bj—j-th shape unit, xi, yi—i-th point coordinates, Xij, Yij—coefficients, which denote how the i-th point coordinates are changed by j-th shape unit. In this case, this system is over determined, so it cancan be solved precisely. Thus, the following minimization is made:

$$(\Sigma_{j=1}^{m} X_{ij} B_j - x_i)^2 + (\Sigma_{j=1}^{m} Y_{ij} B_j - y_i)^2 \rightarrow \min. \quad (6)$$

Let's denote $$X=((X_{ij})^T,(Y_{ij})^T)^T, x=((x_i)^T,(y_i)^T)^T, B=(B_j)^T. \quad (7)$$

This equation system is linear, so it's solution is $$B=(X^T X)^{-1} X^T x \quad (8)$$

In one or more embodiments, it is also possible to use Viola-Jones method and ASM to improve tracking quality. Face tracking methods usually accumulate error over time, so they can lose face position after several hundred frames. In order to prevent it, in the present invention the ASM algorithm is run from time to time to re-initialize tracking algorithm.

Face Tracking

Figure 2:
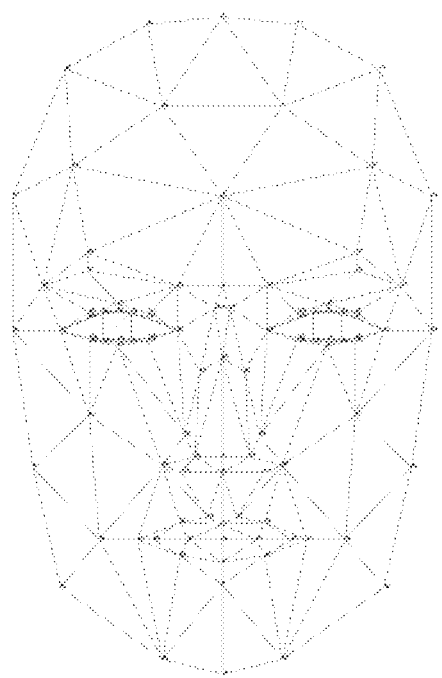
FIG. 2 illustrates Candide-3 model used in the method according to one embodiment of the present invention.

In one or more embodiments, the next step comprises tracking the detected object in the video stream. In the present invention is used the abovementioned Candide-3 model (see Ahlberg, J.: Candide-3, an updated parameterized face. Technical report, Linköping University, Sweden (2001)) for tracking face in a video stream. The mesh or mask corresponding to Candide-3 model is shown in FIG. 2.

Figure 3A:
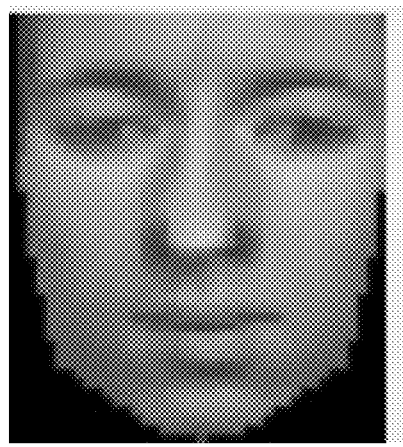
FIG. 3(a)-3(b) show an example of a mean face (a) and an example of current observation.
Figure 3B:
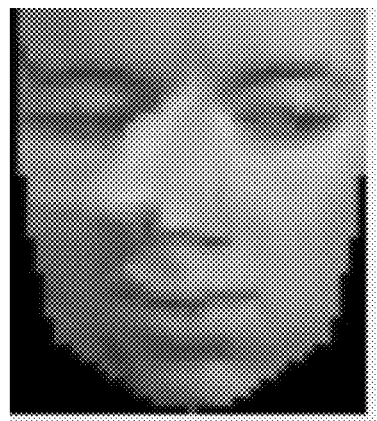
Figure 4:
FIG. 4 illustrates Candide at a frame used in the method according to one embodiment of the present invention.

In one or more embodiments, a state of the model can be described by shape units intensity vector, action units intensity vector and a position-vector. Shape units are some main parameters of a head and a face, in the present invention next 10 units are used:

Eyebrows vertical position
Eyes vertical position
Eyes width
Eyes height
Eye separation distance
Nose vertical position
Nose pointing up
Mouth vertical position
Mouth width
Chin width In one or more embodiments, action units are face parameters that correspond to some face movement, In the present invention next 7 units are used:

Upper lip raiser
Jaw drop
Lip stretcher
Left brow lowerer
Right brow lowerer
Lip corner depressor
Outer brow raiser In one or more embodiments, the mask position at a picture can be described using 6 coordinates: yaw, pitch, roll, x, y, scale. The main idea of the algorithm proposed by Dornaika et al. (Dornaika, F., Davoine, F.: On appearance based face and facial action tracking. IEEE Trans. Circuits Syst. Video Technol. 16 (9):1107-1124 (2006)) is to find the mask position, which observes the region most likely to be a face. For each position it is possible to calculate observation error—the value which indicates the difference between image under current mask position and the mean face. An example of the mean face and of the observation under current position is illustrated in FIGS. 3(a)-3(b). FIG. 3(b) corresponds to the observation under the mask shown in FIG. 4.

In one or more embodiments, face is modeled as a picture with a fixed size (width=40 px, height=46 px) called a mean face. Gaussian distribution that proposed in original algorithms has shown worse result in compare with static image. So the difference between current observation and a mean face is calculated in the following way:

$$e(b)=\Sigma(\log(1+I_m)-\log(1+I_i))^2 \quad (9)$$

Logarithm function makes tracking more stable.

In one or more embodiments, to minimize error Taylor series is used as it was proposed by Dornaika at. el. (see F. Dornaika, F. Davoine, On appearance based face and facial action tracking, in IEEE Transactions on Circuits and Systems for Video Technology, 16 (9), September, 2006, p. 1107-1124). It was found that it is not necessary to sum up a number of finite differences when calculating an approximation to first derivative. Derivative is calculated in the following way:

$$g_{ij} = \frac{W(y_t, b_t + \delta b_t)_{ij} - W(y_t, b_t - \delta b_t)_{ij}}{\delta_j} \quad (10)$$

Here $g_{ij}$ is an element of matrix G. This matrix has size m*n, where m is large enough (about 1600) and n is small (about 14). In case of straight-forward calculating there have to be done n*m operations of division. To reduce the number of divisions this matrix can be rewritten as a product of two matrices:

$$G = A*B$$

Where matrix A has the same size as G and its element is:

$$a_{ij} = W(y_t, b_t + \delta b_t)_{ij} - W(y_t, b_t - \delta b_t)_{ij} \quad (11)$$

and matrix B is a diagonal matrix with sizes n*n, and $$b_{ij} = \delta_i^{-1}$$

Now Matrix $G_t^+$ has to be obtained and here is a place where a number of divisions can be reduced.

$$G_t^+ = (G^T G)^{-1} G^T = (B^T A^T A B)^{-1} B^T A^T = B^{-1} (A^T A)^{-1} B^{-1} {}_\iota B A^T = B^{-1} (A^T A)^{-1} A^T \quad (12)$$

After that transformation this can be done with n*n divisions instead of m*n.

One more optimization was used here. If matrix $G_t^+$ is created and then multiplied to $\Delta b_t$, it leads to $n^2 m$ operations, but if first $A^T$ and $\Delta b_t$ are multiplied and then $N^{-1}(A^T A)^{-1}$ with it, there will be only $n*m + n^3$ operations, that is much better because n«m.

Thus, the step of tracking the detected object in the video stream in the present embodiment comprises creating a mesh that is based on the detected feature points of the object and aligning the mesh to the object on each frame.

It should be also noted that to increase tracking speed in the present invention multiplication of matrices is performed in such a way, that it can be boosted using ARM advanced SIMD extensions (also known as NEON). Also, the GPU is used instead of CPU, whenever possible. To get high performance of the GPU, operations in the present invention are grouped in a special way.

Thus, tracking according to the present invention has the following advantageous features:

1. Before tracking, Logarithm is applied to grayscale the value of each pixel to track it. This transformation has a great impact to tracking performance.

2. In the procedure of gradient matrix creation, the step of each parameter depends on the scale of the mask.

Changing of Proportions

In this disclosure, changing of proportions will be described in terms of making the face thinner/thicker. However, it will be appreciated by one skilled in the art that other proportions of the object, for example a human face, can be changed using the method of the present invention.

In the present embodiment of the method, face tracking results and rigid moving least squares (MLS) deformation method are used for deforming some face details.

In one or more embodiments, image deformations are built based on collections of points with which the user controls the deformation. A set of control points is referred to as p and the deformed positions of the control points p are referred to as q. A deformation function f is constructed which satisfies the three properties outlined in the introduction using Moving Least Squares. Given a point v in the image, the best affine transformation $I_v(x)$ is needed that minimizes $$\Sigma w_i |l_v(p_i) - q_i|^2 \quad (13)$$

where $p_i$ and $q_i$ are row vectors and the weights $w_i$ have the form $$w_i = \frac{1}{|p_i - v|^{2\alpha}} \quad (14)$$

In one or more embodiments, $\alpha = 0.9$ is chosen for the method. In this embodiment, Rigid Deformations method is chosen. However, it is clear for one skilled in the art that other values and methods can be chosen in another embodiments of the present invention. By this method each point v on the image transforms to the point fr(v).

$$f_r(v) = |v - p*| \frac{\sum (q_i - q*) A_i}{|\sum (q_i \cdot q*) A_i|} + q* \quad (15)$$

where $$A_i = w_i(p_i - p*; -(p_i - p*)^\perp)^\top (v - p*; -(v - p*)^\perp) \quad (16)$$

$$(x; y)^\perp = (-y; x) \quad (17)$$

$$p* = \frac{\sum w_i p_i}{\sum w_i} \quad (18)$$

$$q* = \frac{\sum w_i p_i}{\sum w_i} \quad (19)$$

$$|(x; y)| = \sqrt{x^2 + y^2} \quad (20)$$

In one or more embodiments, to make calculations faster a square grid is made on the picture and function's values are calculated in its vertices only. Values in all other pixels are calculated approximately, using bilinear interpolation. This square grid is also associated with the background of the object in the video stream and is used to transform the background of the object to avoid the background distortion.

In mathematics, bilinear interpolation is an extension of linear interpolation for interpolating functions of two variables (e.g., x and y) on a regular 2D grid.

In one or more embodiments, linear interpolation is performed first in one direction, and then again in the other direction. Although each step is linear in the sampled values and in the position, the interpolation as a whole is not linear but rather quadratic in the sample location (details below).

In one or more embodiments, it is further supposed that the value of the unknown function f at the point P=(x, y) is to be found. It is assumed that the value of f at the four points $Q_{11} = (x_1, y_1)$, $Q_{12} = (x_1, y_2)$, $Q_{21} = (x_2, y_1)$, and $Q_{22} = (x_2, y_2)$ is known.

First linear interpolation in the x-direction is made. This yields $$f(R_1) \approx \frac{x_2 - x}{x_2 - x_1} f(Q_{11}) + \frac{x - x_1}{x_2 - x_1} f(Q_{21}) \quad (21)$$

where $R_1=(x,y_1) R_1=(x, y_1)$ $$f(R_2) \approx \frac{x_2 - x}{x_2 - x_1} f(Q_{12}) + \frac{x - x_1}{x_2 - x_1} f(Q_{22}) \quad (22)$$

where $R_1=(x,y_2) R_1=(x,y_2)$

Then interpolating in the y-direction is made:

$$f(P) \approx \frac{y_2 - y}{y_2 - y_1} f(R_1) + \frac{y - y_1}{y_2 - y_1} f(R_2) \quad (23)$$

This gives the desired estimate of f(x, y).

$$f(x, y) \approx \frac{(x_2 - x)(y_2 - y)}{(x_2 - x_1)(y_2 - y_1)} f(x_1, y_1) + \frac{(x - x_1)(y_2 - y)}{(x_2 - x_1)(y_2 - y_1)} f(x_2, y_1) + \frac{(x_2 - x)(y - y_1)}{(x_2 - x_1)(y_2 - y_1)} f(x_1, y_2) + \frac{(x - x_1)(y - y_1)}{(x_2 - x_1)(y_2 - y_1)} f(x_2, y_2) \quad (24)$$

Figure 5:
FIG. 5 shows an example of the square grid used in the method according to one embodiment of the present invention.

Red pixels as the vertices of the grid are shown in FIG. 5.

In one or more embodiments, to make calculations faster the values of $w_i$ are being pre-calculated for all integer vectors $p_i-v$ in the beginning of the program work and real values are not being calculated during algorithm work. They are being taken by the nearest neighbor method.

In one or more embodiments, for each pixel of the resulting point its value is calculated using the next formula:

$$c_u = \frac{\sum_{|u \cdot x - f_r(v) \cdot x| < 1 \& |u \cdot y - f_r(v) \cdot y| < 1} c_v (1 - |f_r(v) \cdot x - u \cdot x|) \cdot (1 - |f_r(v) \cdot y - u \cdot y|)}{\sum_{|u \cdot x - f_r(v) \cdot x| < 1 \& |u \cdot y - f_r(v) \cdot y| < 1} (1 - |f_r(v) \cdot x - u \cdot x|) \cdot (1 - |f_r(v) \cdot y - u \cdot y|)} \quad (25)$$

where u is a point on the resulting image, v is a point on the initial image, $c_u$ is a color of pixel u, $c_v$ is a color of pixel v. To find all the pixels on the initial image which satisfy the condition $$|u \cdot x - f_r(v) \cdot x| < 1 \& |u \cdot y - f_r(v) \cdot y| < 1 \quad (26)$$

it is not necessary to look through all the pixels. Instead the transformation $f_r$ is built and for each point $f_r(v)$ the nearest pixels are found:

$$([f_r(v) \cdot x], [f_r(v) \cdot y]) \quad (27)$$

$$([f_r(v) \cdot x]+1, [f_r(v) \cdot y]) \quad (28)$$

$$([f_r(v) \cdot x], [f_r(v) \cdot y]+1) \quad (29)$$

$$([f_r(v) \cdot x]+1, [f_r(v) \cdot y]1) \quad (30)$$

and save two corresponding sums for them:

$$\text{bufferSums}[u] += c_v(1 - |f_r(v) \cdot x - u \cdot x|)(1 | f_r(v) \cdot y - u \cdot y|) \quad (31)$$

$$\text{bufferWeight}[u] += (1 - |f_r(v) \cdot x - u \cdot x|)(1 | f_r(v) \cdot y - u \cdot y|) \quad (32)$$

Then the color value in each pixel can be calculated as following:

$$c_u = \frac{\text{bufferSums}[u]}{\text{bufferWeight}[u]} \quad (33)$$

If some resulting points don't have a prototype, their values are calculated using bilinear interpolation on neighbors.

Figure 6:
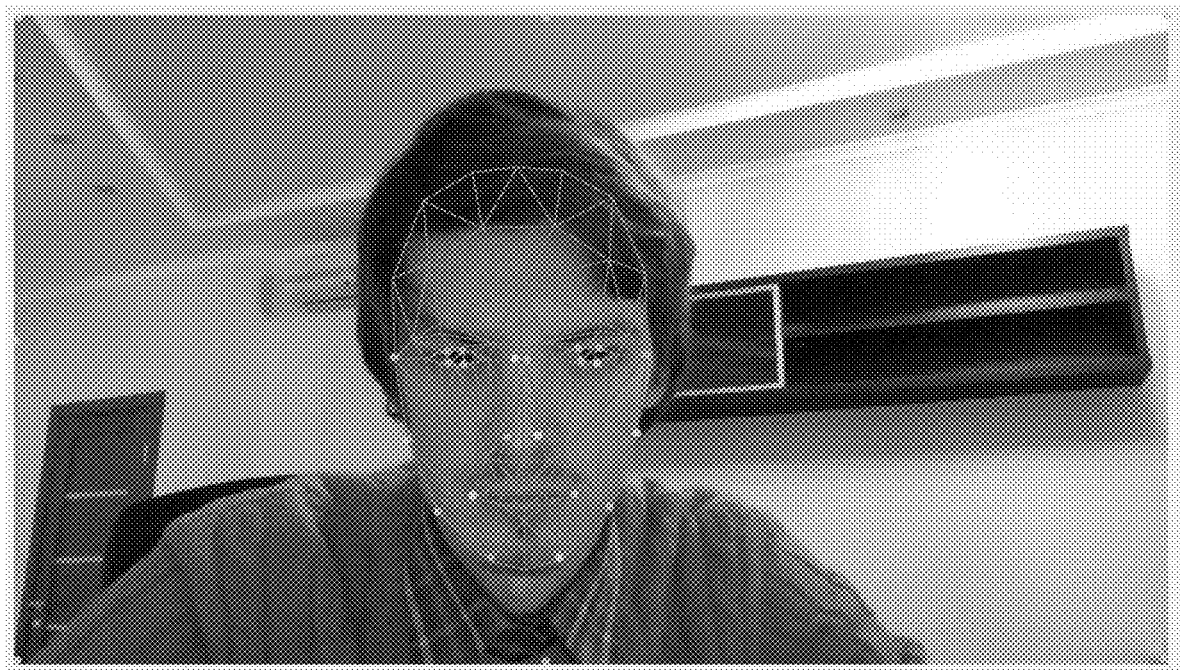
FIG. 6 illustrates a set of control points p.

In one or more embodiments, face tracking results are used to choose sets of control points p and q. Some vertices of Candide are projected to the plane and 8 points are added: 4 corner points and 4 middles of borders. This set of points is taken as p. On the FIG. 6 the choice of control points (marked green) is shown.

In one or more embodiments, to obtain set q Deformation units to Candide were introduced. They are some parameters that correspond to the desired deformations. In this embodiment 3 deformation units are added:

Fatness
Nose width
Eye width

However, in other embodiments other deformation units can be chosen to implement the desired face deformation.

In one or more embodiments, each of Deformation units influences on some Candide points' positions and it has its current value in each moment of time—the bigger value, the bigger influence. For example, to make a man fatter, Fatness value should be increased and to make him thinner it should be decreased.

Figure 7:
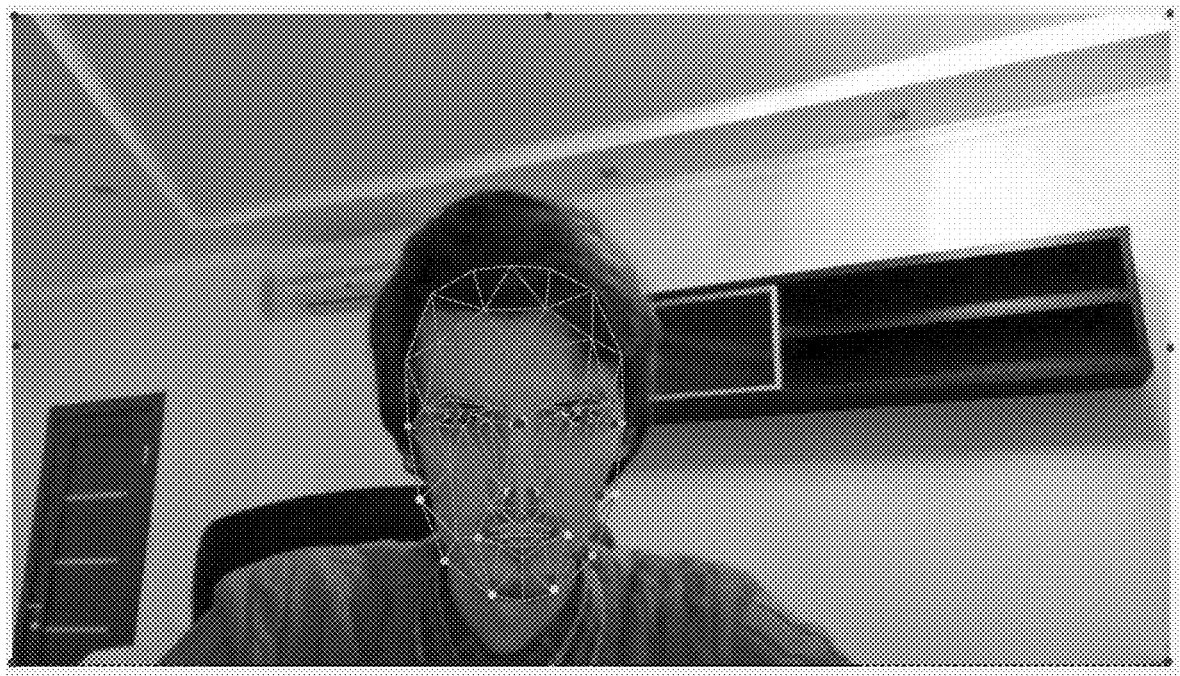
FIG. 7 illustrates the difference between points' of p and q positions.

Thus, in each moment of time two Candide models with equal values of Shape and Action units are present, but with different values of Deformation units. The first Candide corresponds to the real face form and the second one corresponds to the wanted form. By the second Candide points' projection to the plane set q is obtained. On the FIG. 7 the difference between sets p (green points) and q (corresponding blue points) is shown. Than MLS is used to get transformation of p into q.

Here are values of Deformation units' influence on the chosen points in the described embodiment:

Fatness (8)

| | | | |
|---|---|---|---|
| 62 | 0.050000 | 0.000000 | 0.000000 |
| 61 | 0.100000 | 0.000000 | 0.000000 |
| 63 | 0.110000 | 0.000000 | 0.000000 |
| 29 | −0.050000 | 0.000000 | 0.000000 |
| 28 | −0.100000 | 0.000000 | 0.000000 |
| 30 | −0.110000 | 0.000000 | 0.000000 |
| 65 | 0.000000 | 0.100000 | 0.000000 |
| 32 | 0.000000 | 0.100000 | 0.000000 |

Nose Width (4)

| | | | |
|---|---|---|---|
| 76 | 0.050000 | 0.000000 | 0.000000 |
| 75 | −0.050000 | 0.000000 | 0.000000 |
| 78 | 0.030000 | 0.000000 | 0.000000 |
| 77 | −0.030000 | 0.000000 | 0.000000 |

Eye Width (10)

| 52 | 0.000000 | 0.030000 | 0.000000 |
|----|----------|----------|----------|
| 53 | −0.020000 | 0.000000 | 0.000000 |
| 56 | 0.020000 | 0.000000 | 0.000000 |
| 57 | 0.000000 | −0.030000 | 0.000000 |
| 73 | 0.000000 | 0.025000 | 0.000000 |
| 19 | 0.000000 | 0.030000 | 0.000000 |
| 20 | 0.020000 | 0.000000 | 0.000000 |
| 23 | −0.020000 | 0.000000 | 0.000000 |
| 24 | 0.000000 | −0.030000 | 0.000000 |
| 71 | 0.000000 | 0.025000 | 0.000000 |

Examples of Fatness and Nose width deformations' applying are shown in FIGS. 8(a)-8(c). To make fat deformation more natural mouth is not stretched while making people fatter but mouth is compressed while making people thinner.

Thus, the algorithm has to:
1. find the Candide position (Shape and Action units)
2. apply Deformation units to the second Candide
3. project both Candides to obtain sets p and q
4. build the deformation using MLS in grid vertices
5. calculate deformation in all pixels using bilinear interpolation
6. build resulting picture In one or more embodiments, to make this effect a real time GPU is used with some optimizations of its functioning. The image is split with regular grid and the transformation is calculated only in its nodes. Then the linear interpolation is used to get transformation at each pixel. With increasing of grid size fps (frames per second) is increased but quality becomes worse.

Thus, changing of the object's proportions in real time in video stream according to the present invention has the following distinguishing features. In the original algorithm the inventors have to compute transformation for each pixel, but on a device it runs slow. To increase speed the inventors divide plane of image with regular grid and compute transformation in grid nodes only. Transformation in other pixels is interpolated.

Further advantages of the described embodiments are given by the fact that the method of real time video stream processing for changing proportions of an object in the video stream can be implemented on mobile devices, for example such as mobile phones, smart phones, tablet computers etc., since the method is not resource-intensive.

Exemplary Computer Platform

Figure 9:
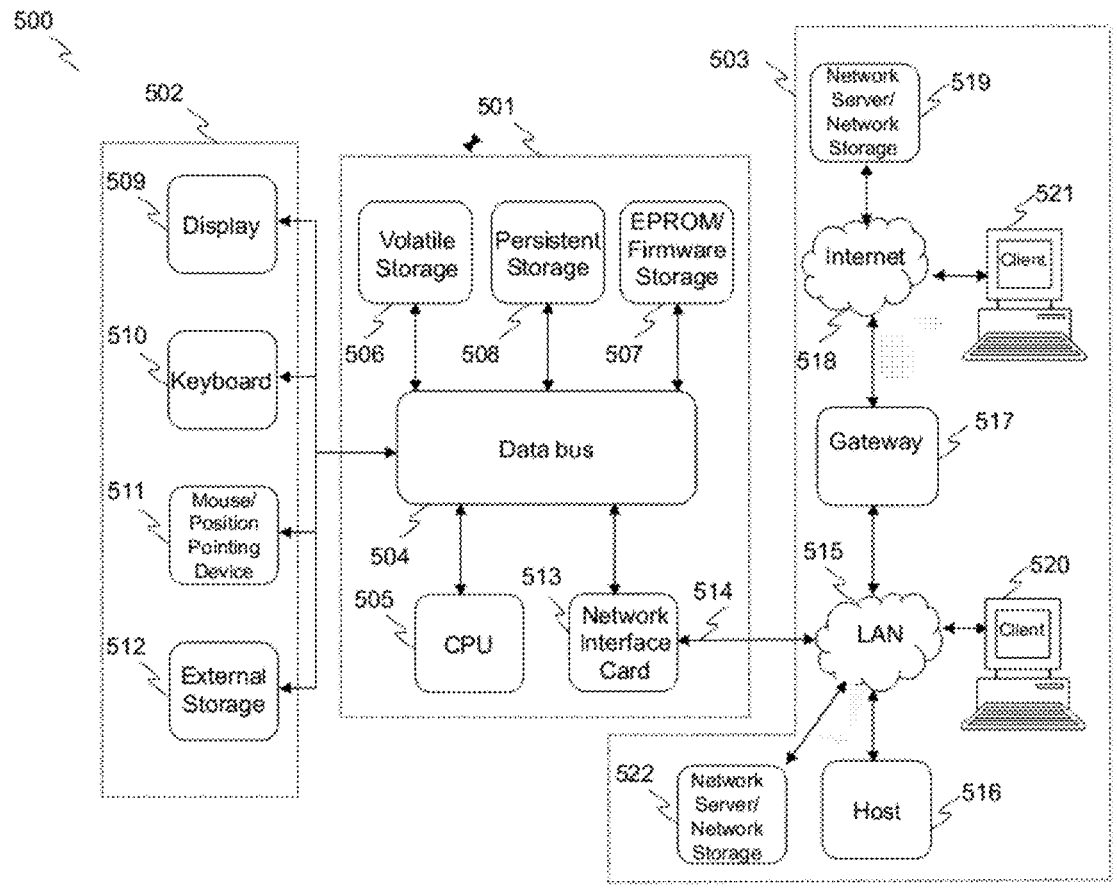
FIG. 9 illustrates an exemplary embodiment of a computer platform based on which the techniques described herein may be implemented.

FIG. 9 is a block diagram that illustrates an embodiment of a computer system 500 upon which various embodiments of the inventive concepts described herein may be implemented. The system 500 includes a computer platform 501, peripheral devices 502 and network resources 503.

The computer platform 501 may include a data bus 504 or other communication mechanism for communicating information across and among various parts of the computer platform 501, and a processor 505 coupled with bus 504 for processing information and performing other computational and control tasks. Computer platform 501 also includes a volatile storage 506, such as a random access memory (RAM) or other dynamic storage device, coupled to bus 504 for storing various information as well as instructions to be executed by processor 505, including the software application for implementing multifunctional interaction with elements of a list using touch-sensitive devices described above. The volatile storage 506 also may be used for storing temporary variables or other intermediate information during execution of instructions by processor 505. Computer platform 501 may further include a read only memory (ROM or EPROM) 507 or other static storage device coupled to bus 504 for storing static information and instructions for processor 505, such as basic input-output system (BIOS), as well as various system configuration parameters. A persistent storage device 508, such as a magnetic disk, optical disk, or solid-state flash memory device is provided and coupled to bus 504 for storing information and instructions.

Computer platform 501 may be coupled via bus 504 to a touch-sensitive display 509, such as a cathode ray tube (CRT), plasma display, or a liquid crystal display (LCD), for displaying information to a system administrator or user of the computer platform 501. An input device 510, including alphanumeric and other keys, is coupled to bus 504 for communicating information and command selections to processor 505. Another type of user input device is cursor control device 511, such as a mouse, a trackball, or cursor direction keys for communicating direction information and command selections to processor 505 and for controlling cursor movement on touch-sensitive display 509. This input device typically has two degrees of freedom in two axes, a first axis (e.g., x) and a second axis (e.g., y), that allows the device to specify positions in a plane. To detect user's gestures, the display 509 may incorporate a touchscreen interface configured to detect user's tactile events and send information on the detected events to the processor 505 via the bus 504.

An external storage device 512 may be coupled to the computer platform 501 via bus 504 to provide an extra or removable storage capacity for the computer platform 501. In an embodiment of the computer system 500, the external removable storage device 512 may be used to facilitate exchange of data with other computer systems.

The invention is related to the use of computer system 500 for implementing the techniques described herein. In an embodiment, the inventive system may reside on a machine such as computer platform 501. According to one embodiment of the invention, the techniques described herein are performed by computer system 500 in response to processor 505 executing one or more sequences of one or more instructions contained in the volatile memory 506. Such instructions may be read into volatile memory 506 from another computer-readable medium, such as persistent storage device 508. Execution of the sequences of instructions contained in the volatile memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as the persistent storage device 508. Volatile media includes dynamic memory, such as volatile storage 506.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 505 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 504. The bus 504 carries the data to the volatile storage 506, from which processor 505 retrieves and executes the instructions. The instructions received by the volatile memory 506 may optionally be stored on persistent storage device 508 either before or after execution by processor 505. The instructions may also be downloaded into the computer platform 501 via Internet using a variety of network data communication protocols well known in the art.

The computer platform 501 also includes a communication interface, such as network interface card 513 coupled to the data bus 504. Communication interface 513 provides a two-way data communication coupling to a network link 514 that is coupled to a local network 515. For example, communication interface 513 may be an integrated services digital network (ISDN) card or a modem to provide a data communication connection to a corresponding type of telephone line. As another example, communication interface 513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 513 sends and receives electrical, electromagnetic or optical signals that carry digital data streams representing various types of information.

Network link 514 typically provides data communication through one or more networks to other network resources. For example, network link 514 may provide a connection through local network 515 to a host computer 516, or a network storage/server 522. Additionally or alternatively, the network link 514 may connect through gateway/firewall 517 to the wide-area or global network 518, such as an Internet. Thus, the computer platform 501 can access network resources located anywhere on the Internet 518, such as a remote network storage/server 519. On the other hand, the computer platform 501 may also be accessed by clients located anywhere on the local area network 515 and/or the Internet 518. The network clients 520 and 521 may themselves be implemented based on the computer platform similar to the platform 501.

Local network 515 and the Internet 518 both use electrical, electromagnetic or optical signals that carry digital data streams. The signals through the various networks and the signals on network link 514 and through communication interface 513, which carry the digital data to and from computer platform 501, are exemplary forms of carrier waves transporting the information.

Computer platform 501 can send messages and receive data, including program code, through the variety of network(s) including Internet 518 and LAN 515, network link 515 and communication interface 513. In the Internet example, when the system 501 acts as a network server, it might transmit a requested code or data for an application program running on client(s) 520 and/or 521 through the Internet 518, gateway/firewall 517, local area network 515 and communication interface 513. Similarly, it may receive code from other network resources.

The received code may be executed by processor 505 as it is received, and/or stored in persistent or volatile storage devices 508 and 506, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for real time video stream processing. It is intended that the specification and examples be considered as exemplary only, with a true scope and spirit of the invention being indicated by the following claims.

What is claimed is:

1. A computer implemented method comprising:
   receiving a video depicting an object comprising a face;
   receiving a user request for changing a proportion of the object, the request comprising a request to change fatness of the face; and
   after receiving the user request for changing the proportion of the object:
   initializing a tracking process to detect the object in the video;
   deforming a first portion of the detected object depicted in the video by a first deformation amount, in accordance with the user request for changing the proportion, while deforming a second portion of the object depicted in the video by a second deformation amount, the deforming comprising:
      causing the first portion of the object to be deformed without stretching a mouth portion of the face in response to increasing the fatness of the face based on the request; and
      causing the first portion of the object to be deformed together with compressing the mouth portion of the face in response to decreasing the fatness of the face based on the request;
   providing the video comprising the deformed first portion of the object and the deformed second portion of the object; and from time to time, re-initializing the tracking process to re-detect the object in the video to continue deforming the first and second portions of the object.

2. The computer implemented method of claim 1, wherein the object comprises a face that at least partially and at least occasionally is presented in frames of the video, further comprising:
detecting feature reference points of the face;
tracking the detected face in the video, wherein the tracking comprises creating a first mesh based on the detected feature reference points of the face and aligning the first mesh to the face in each frame;
while tracking the detected face with the first mesh, transforming a set of pixels within the frames of the video representing a portion of the feature reference points to generate transformed frames of the video; and
maintaining the first mesh while the face is present in the frames of e video.

3. The computer implemented method of claim 2, wherein the feature reference points are at least one of points indicating eyebrows vertical position, eyes vertical position, eyes width, eyes height, eye separation distance, nose vertical position, nose pointing up, mouth vertical position, mouth width, chin width, upper lip raiser, jaw drop, lip stretcher, left brow lowerer, right brow lowerer, lip corner depressor, or outer brow raiser.

4. The computer implemented method of claim 1, further comprising:
associating a square grid with a background of the object in the video; and
transforming the background of the object using the square grid to avoid background distortion.

5. The computer implemented method of claim 1, further comprising:
indicating a presence of the object from a list of objects in frames of the video, wherein the list further comprises rules for changing proportions of each object from the list; and
generating a request for changing proportions of the object which presence in frames of the video is indicated.

6. The computer implemented method of claim 1, further comprising:
defining the object to be changed in frames of the video and rules for changing proportions of the object by a user.

7. The computer implemented method of claim 1, further comprising:
defining by a user a frame area of the video to be processed, wherein the frame area to be processed sets a frame area of the video where only proportions of those objects or their parts which are positioned in the frame area to be processed are changed.

8. The computer implemented method of claim 1, further comprising:
randomly selecting the object to be changed in frames of the video out of objects in the frames of the video and randomly selecting at least one rule for changing proportions of the selected object out of a list of rules; and
generating the request for changing proportions of the randomly selected object based on the randomly selected rules.

9. The computer implemented method of claim 1, further comprising:
applying a transformation function only in vertices of a square grid associated with frames of the video; and after the transformation function is applied only in the vertices, computing values in a collection of pixels approximately using linear interpolation in a first direction based on values of the vertices; and
after computing the values in the collection of pixels in the first direction, computing values of the collection of pixels approximately using linear interpolation in a second direction based on the values of the vertices.

10. The computer implemented method of claim 1, wherein the tracking process comprises an Active Shape Model (ASM).

11. The method of claim 1, further comprising:
generating a transformation between a pixel of a frame of the video and a corresponding modified pixel in a second frame of the video, the modified pixel being generated based on the user request for changing the proportion of the object;
identifying a set of nearby pixels to the pixel of the frame based on the transformation;
computing two sums for the set of nearby pixels, a first sum of the two sums being computed by scaling values of the set of nearby pixels by the pixel of the frame, a second sum of the two sums being computed based on the values of the set of nearby pixels; and
generating the corresponding modified pixel based on a ratio of the first sum and the second sum.

12. The method of claim 1, further comprising:
obtaining grayscale values of each pixel of the object in the video;
applying a logarithm to the grayscale values of each pixel of the object in the video before tracking the object; and
tracking the object in the video based on the logarithm of the grayscale values.

13. A system comprising:
a central processing unit and a memory, the memory storing instructions for performing operations comprising:
receiving a video depicting an object comprising a face;
receiving a user request for changing a proportion of the object, the request comprising a request to change fatness of the face; and
after receiving the user request for changing the proportion of the object:
initializing a tracking process to detect the object in the video;
deforming a first portion of the detected object depicted in the video by a first deformation amount, in accordance with the user request for changing the proportion, while deforming a second portion of the object depicted in the video by a second deformation amount, the deforming comprising:
causing the first portion of the object to be deformed without stretching a mouth portion of the face in response to increasing the fatness of the face based on the request; and
causing the first portion of the object to be deformed together with compressing the mouth portion of the face in response to decreasing the fatness of the face based on the request;
providing the video comprising the deformed first portion of the object and the deformed second portion of the object; and
from time to time, re-initializing the tracking process to re-detect the object in the video to continue deforming the first and second portions of the object.

14. The system of claim 13, wherein the object comprises a face that at least partially and at least occasionally is presented in frames of the video, further comprising operations for:
- detecting feature reference points of the face;
- tracking the detected face in the video, wherein the tracking comprises creating a first mesh based on the detected feature reference points of the face and aligning the first mesh to the face in each frame;
- while tracking the detected face with the first mesh, transforming a set of pixels within the frames of the video representing a portion of the feature reference points to generate transformed frames of the video; and
- maintaining the first mesh while the face is present in the frames of the video.

15. The system of claim 14, wherein the feature reference points are at least one of points indicating eyebrows vertical position, eyes vertical position, eyes width, eyes height, eye separation distance, nose vertical position, nose pointing up, mouth vertical position, mouth width, chin width, upper lip raiser, jaw drop, lip stretcher, left brow lowerer, right brow lowerer, lip corner depressor, or outer brow raiser.

16. The system of claim 13, further comprising operations for:
- associating a square grid with a background of the object in the video; and
- transforming the background of the object using the square grid to avoid background distortion.

17. The system of claim 13, wherein the operations further comprise:
- generating a transformation between a pixel of a frame of the video and a corresponding modified pixel in a second frame of the video, the modified pixel being generated based on the user request for changing the proportion of the object;
- identifying a set of nearby pixels to the pixel of the frame based on the transformation;
- computing two sums for the set of nearby pixels, a first sum of the two sums being computed by scaling values of the set of nearby pixels, a second sum of the two sums being computed based on the values of the set of nearby pixels; and
- generating the corresponding modified pixel based on a ratio of the first sum and the second sum.

18. A non-transitory computer readable medium comprising non-transitory computer readable instructions that, when executed by one or more processors, configure the one or more processors to perform operations comprising:
- receiving a video depicting an object comprising a face;
- receiving a user request for changing a proportion of the object, the request comprising a request to change fatness of the face; and
- after receiving the user request for changing the proportion of the object:
    - initializing a tracking process to detect the object in the video;
    - deforming a first portion of the detected object depicted in the video by a first deformation amount, in accordance with the user request for changing the proportion, while deforming a second portion of the object depicted in the video by a second deformation amount, the deforming comprising:
        - causing the first portion of the object to be deformed without stretching a mouth portion of the face in response to increasing the fatness of the face based on the request; and
        - causing the first portion of the object to be deformed together with compressing the mouth portion of the face in response to decreasing the fatness of the face based on the request;
    - providing the video comprising the deformed first portion of the object and the deformed second portion of the object; and
    - after a threshold time period from time to time, re-initializing the tracking process to re-detect the object in the video to continue deforming the first and second portions of the object.

19. The non-transitory computer readable medium of claim 18, wherein the operations further comprise:
- generating a transformation between a pixel of a frame of the video and a corresponding modified pixel in a second frame of the video, the modified pixel being generated based on the user request for changing the proportion of the object;
- identifying a set of nearby pixels to the pixel of the frame based on the transformation;
- computing two sums for the set of nearby pixels, a first sum of the two sums being computed by scaling values of the set of nearby pixels, a second sum of the two sums being computed based on the values of the set of nearby pixels; and
- generating the corresponding modified pixel based on a ratio of the first sum and the second sum.

20. The non-transitory computer readable medium of claim 18, wherein the object comprises a face that at least partially and at least occasionally is presented in frames of the video, further comprising operations for:
- detecting feature reference points of the face;
- tracking the detected face in the video, wherein the tracking comprises creating a first mesh based on the detected feature reference points of the face and aligning the first mesh to the face in each frame;
- while tracking the detected face with the first mesh, transforming a set of pixels within the frames of the video representing a portion of the feature reference points to generate transformed frames of the video; and
- maintaining the first mesh while the face is present in the frames of the video.

* * * * *